United States Patent [19]

Notz

[11] 3,995,009
[45] Nov. 30, 1976

[54] PROCESS FOR LOADING WEAK-ACID ION EXCHANGE RESIN WITH URANIUM
[75] Inventor: Karl J. Notz, Oak Ridge, Tenn.
[73] Assignee: The United States of America as represented by the United States Energy Research and Development Administration, Washington, D.C.
[22] Filed: Sept. 15, 1975
[21] Appl. No.: 613,704

[52] U.S. Cl. .................... 423/7; 210/38 C; 260/2.2 C
[51] Int. Cl.² ............................................ B01J 1/08
[58] Field of Search ............... 423/7; 210/38 C; 260/2.2 C

[56] References Cited
UNITED STATES PATENTS

| 2,780,514 | 2/1957 | Lutz | 423/7 |
| 2,991,148 | 7/1961 | Mooradian | 210/38 C X |
| 3,079,225 | 2/1963 | Baybarz | 423/7 |
| 3,136,600 | 6/1964 | Adar et al. | 423/7 |
| 3,240,556 | 3/1966 | Bhappa | 423/7 |
| 3,800,023 | 3/1974 | Haas | 423/7 |
| 3,880,769 | 4/1975 | Googin et al. | 423/74 |

FOREIGN PATENTS OR APPLICATIONS

| 1,038,992 | 8/1966 | United Kingdom | 423/7 |

Primary Examiner—Richard E. Schafer
Attorney, Agent, or Firm—Dean E. Carlson; David S. Zachry; John B. Hardaway

[57] ABSTRACT

A method for loading ion exchange resins is described. The process comprises contacting a weak acid cation exchange resin in the ammonium form with a uranyl fluoride salt solution.

6 Claims, 1 Drawing Figure

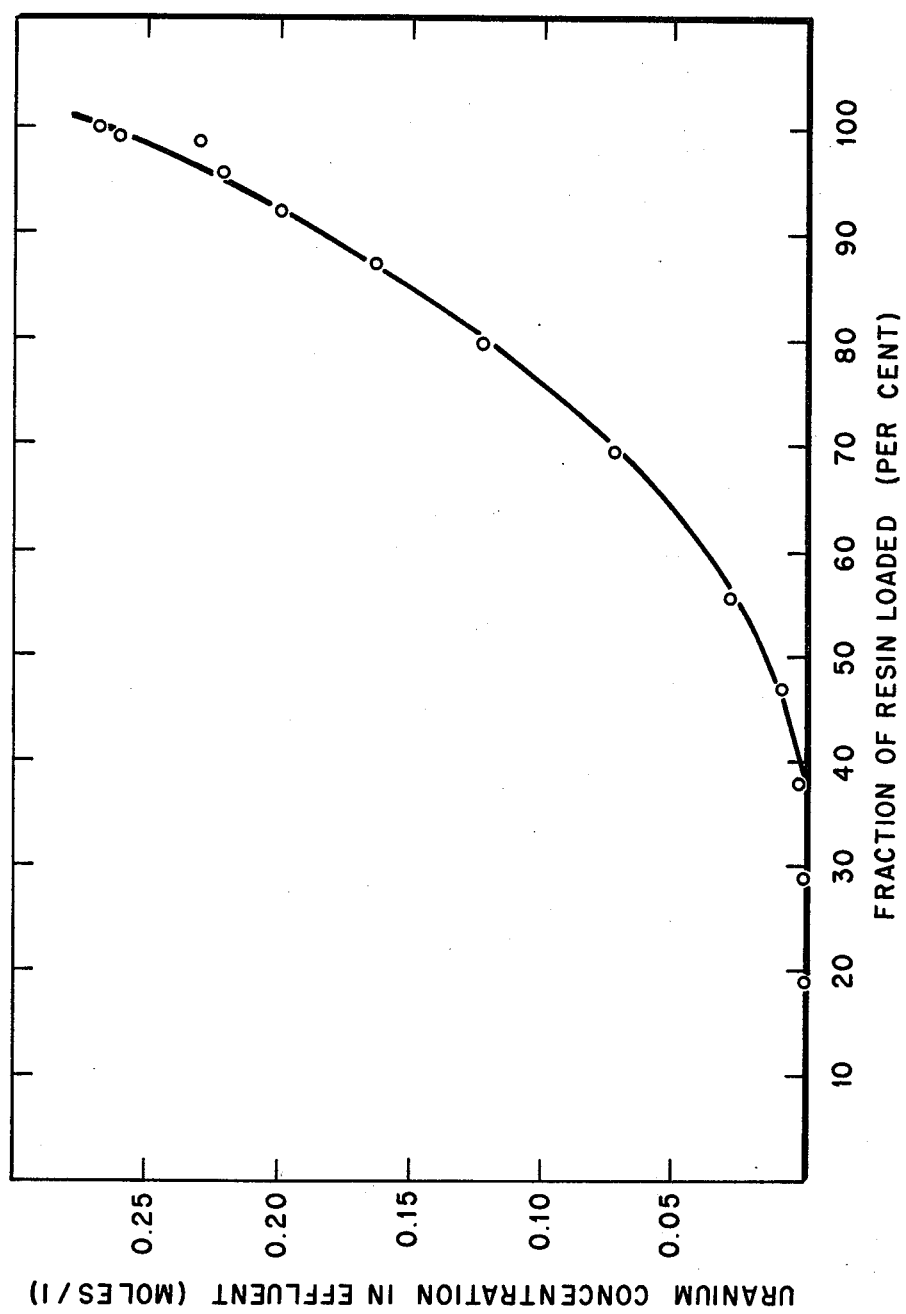

PROCESS FOR LOADING WEAK-ACID ION EXCHANGE RESIN WITH URANIUM

BACKGROUND OF THE INVENTION

This invention was made in the course of, or under, a contract with the U.S. Energy Research and Development Administration. It relates generally to a method for loading weak acid cation exchange resins with uranyl ions.

Cation exchange resins have been used in the past for producing nuclear fuels. One such method is described by Lonadier et al. in U.S. Pat. No. 3,438,749. Another method is described in U.S. Pat. Nos. 3,880,769 and 3,887,486, commonly assigned herewith. The commonly assigned patents described a process wherein cation exchange resins are loaded with U, Pu or Th ions. Subsequent heat treatment of the loaded resin produces a microsphere of either the carbide or oxide of the loaded cation within a carbon matrix. Such microspheres are useful as nuclear fuels.

Microspheres intended for use as a nuclear fuel must conform to very strict quality requirements. The completed carbonized microspheres must be uniformly spherical, be crack free with no internal voids in excess of 0.1 micron, and have diameters within ±10% of the mean diameter. The resin microspheres should also be loaded to high uranium contents as the nuclear fuel has minimum concentration limits. A loading of 1.8 milliequivalents of uranium per ml. of resin can be used in some cases, but higher loadings are preferred.

Resins used in the above processes are normally loaded by contacting the resin in the hydrogen form with a salt solution of the metal to be loaded. Solutions of, for example, $UO_2(NO_3)_2$ or $UO_2F_2$ have been used for loading resin with uranyl ions. Loading has been done both in column and batch operations. A problem resulting from the column operation is that the resin at the top of the column initially sees a solution of different concentration from that at the bottom of the column, thus resulting initially in non-uniform loading of the resin. A similar phenomenon is observed when loading in a batch process in that the concentration of the ionic loading species varies with time. In either case, the concentration of hydrogen ions or the other cations released by the loading of the resin increases with time and hinders full loading of the resin or complete utilization of the loading species. In other words, accumulation of products of the loading reaction stop the reaction before either the resin is completely loaded or the solution is depleted of the loading species.

Two common types of cation exchange resins used in the above prior art process are strong acid and weak acid. The most prevalent strong acid resins are composed of a sulfonated copolymer of styrene and divinyl benzene. The percentage of divinyl benzene is referred to as the percent crosslinkage since the divinyl benzene forms the cross-bonds of the copolymer. The sulfonic functional group ($SO_3^-$) has attached to it a hydrogen ion which will exchange with the cation to be loaded. While the strong acid resins have many desirable characteristics, the presence of the sulfur is undesirable because it is retained as an impurity in the completed fuel. Sulfur, if present during fuel processing and reactor operations, causes corrosion of equipment as well as necessitating steps to prevent release to the atmosphere.

Weak acid resins have a carboxylic acid functional group attached to a copolymer of either methacrylic or acrylic acid cross-linked with divinyl benzene. Weak acid resins are more desirable for use in making nuclear fuels because they have no residual sulfur and have a higher theoretical loading capacity than the strong acid resins. A major problem, however, to overcome in the loading of these resins with uranium is the displacement of the hydrogen ion.

One prior art technique for loading weak acid resins is disclosed in U.S. Pat. No. 3,800,023. Disclosed therein is a process wherein an acid-deficient solution of uranyl nitrate is used to contact the hydrogen form of the resin and thus load the resin with uranyl ions from the solution. The solution is maintained in the acid-deficient state by maintenance of excess of $UO_3$ within the solution such that uranyl ions lost to the resin are replaced from the excess $UO_3$. This neutralizes the hydrogen ion released by the resin during loading. The term "acid-deficient" is used because the composition of the solution of uranyl nitrate in contact with excess $UO_3$ is approximately $UO_2(OH)_{0.5}(NO_3)_{1.5}$, rather than $UO_2(NO_3)_2$. The maximum acid deficiency is about one-half mole of nitrate per mole of uranium.

Another prior art technique of resin loading from an acid deficient solution of uranyl nitrate comprises the use of an amine extractant to extract the hydrogen ions from the solution. Via this technique the acid product of the reaction is removed from solution to allow the overall reaction to proceed to near completion. This process is carried out by dissolving an amine extractant in an organic diluent, and extracting nitric acid from the uranyl nitrate solution via two-phase, liquid-liquid contact. The acid-deficient uranyl nitrate is recycled to the resin loading step, while the acid-loaded amine is regenerated by contacting with NaOH solution, also in the two-phase, liquid-liquid contact.

Inherent in these prior art processes is the use of uranyl nitrate and/or $UO_3$ as a reactant. While these processes are all quite satisfactory for loading resin particles with uranyl ions, they all suffer from a disadvantage in the number of processing steps required to produce the uranyl nitrate solution from enriched uranium. Uranium is presently enriched in the form of $UF_6$ such that any uranium compounds which are ultimately formed into a fuel must be derived from $UF_6$, which is usually converted first to uranyl fluoride, then to oxide, and finally to the nitrate.

SUMMARY OF THE INVENTION

It is thus an object of this invention to provide a process for producing nuclear reactor fuel particles which requires fewer processing steps from the enrichment facility to final fuel form than prior art processes.

It is a further object of this invention to provide a process for loading ion exchange resins from an aqueous uranyl fluoride solution.

It is a further and more particular object of his invention to provide a process for loading weak acid resins with uranyl ions without the necessity of maintaining an acid deficient solution.

These as well as other objects are accomplished by a process wherein a uranyl fluoride solution is used to load a weak acid ion exchange resin wherein the resin is in the ammonium form.

BRIEF DESCRIPTION OF THE DRAWING

The single FIGURE of drawing graphically illustrates conditions observed while carrying out Example I.

DETAILED DESCRIPTION

In accordance with this invention, it has been discovered that weak acid resins in the hydrogen form will not load from a uranyl fluoride solution to a useful degree even when the solution is in the acid deficient state. It has additionally been discovered, however, that if the same resin is converted to the ammonium form, it will load to about 92–95% of the theoretical limit.

The process of this invention is applicable to the loading of any resin. Strong acid resins, however, load satisfactorily from a uranyl fluoride solution when in the hydrogen form. The primary utility of this invention is thus in the loading of weak acid resins with uranyl ions. By using the ammonium form of the resin, no hydrogen ions are released to cause the loading reaction to cease.

As used within this disclosure, the term weak acid resin refers to a cation exchange resin having a carboxylic acid functional group. Such weak acid resins may have a matrix of polymerized acrylic or methacrylic acid crosslinked with divinyl benzene. The preferred resin for use in the process of this invention comprises an acrylic-divinyl benzene copolymer having a carboxylic acid functional group and a moisture content of 71 to 73 percent in the sodium form group. Such a resin is marketed as "Amberlite IRC-72" from Rohm and Hass Company. This resin is preferred because of its spherical form and high uranium capacity. Most weak acid resins are commercially available either in the sodium form or in the acid form. Prior to carrying out the process of this invention the resin must be converted to the ammonium form. This is preferably done by contacting the acid form with excess ammonium hydroxide. The sodium form of resin must first be converted to the acid form by contacting with excess nitric acid prior to converting to the ammonium form.

The essence of this invention comprises contacting the ammonium form of resin with a 0.1 to 1.0, and preferably about 0.3, molar aqueous uranyl fluoride solution. About 400 ml. of 0.3 molar solution is required to fully load 25 milliliters of resin. About 6 hours at room temperature is generally required to fully load this amount of resin. The effluent loading solution will generally have a pH of about 10 as the loading reaction is begun and will drop to about 3 when the reaction is complete. An excess of loading solution is required to completely load the resin with uranyl ions. The loading reaction generally proceeds as follows:

where R represents the resin. Thus at the beginning of a column loading operation, ammonium fluoride is the column effluent. However, toward the end of the loading a heel of uranyl fluoride and ammonium fluoride is the column effluent. A portion of the uranyl fluoride in this heel may be used in subsequent loading process. The contacting step must be carried out in a column or by some other technique whereby the loading product is removed from the reaction environment. The preferred method of contacting is to use a semi-continuous pulsed column such as that disclosed in U.S. Pat. No. 2,815,322. Temperature is not a critical parameter of this process and thus the contacting step is preferably carried out at room temperature.

The loaded resin particles are dried and then carbonized in accordance with known techniques to produce the final fuel particles. Such techniques are described in commonly assigned copending applications Ser. Nos. 480,323 and 480,324.

The process of this invention thus permits the loading of weak acid resins with uranyl ions with fewer steps from the enrichment plant to the final form that has heretofore available. For example, the $UF_6$ which is enriched in $U^{235}$ may be converted to uranyl fluoride for use in the process of this invention by the process described in British Pat. No. 1,260,562. Such a process comprises the hydrolysis of $UF_6$ to $UO_2F_2$ by steam at a temperature of about 700° F. within a fluidized bed of uranyl fluoride. The hydrolysis reaction is carried out as follows:

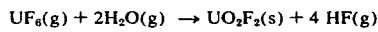

The uranyl fluoride produced by such a process is suitable for forming the aqueous solution from which the ammonium form cation exchange resins are loaded.

The process of this invention has the following advantages over prior art techniques utilizing uranyl nitrate:

1. Weak acid resin can be loaded with uranium from uranyl fluoride, which is obtainable directly from $UF_6$. Uranyl nitrate or $UO_3$ is not required, nor is an "acid-deficient" feed required.

2. The waste stream, $NH_4F$ solution, is amenable to disposal. It is not as difficult to dispose of an HF or $NH_4NO_3$.

3. Using the ammonium form of the resin introduces no undesirable cations, either as a residue in the resin or as an impurity in the fluoride solution. Should a trace of $NH_4^+$ remain in the resin, it will readily fire out during normal thermal treatment (as opposed to $Na^+$, $Mg^{+2}$, etc.).

The results produced by the process of this invention are surprising in the following regards:

1. Loading occurs as uranyl ion, $UO_2^{++}$, rather than as a complex fluoride-containing ion such as $UO_2F^+$.

2. Approximately 40% loading can be achieved with essentially complete utilization of uranium.

Having generally described the process of this invention, the following specific examples are given as a further illustration thereof.

EXAMPLE I

Sodium form "Amberlite IRC-72" resin of 26–32 mesh was treated with 2 M $HNO_3$ in a small column in downflow to convert to the hydrogen form by displacement because it was desired to minimize any residual sodium content. The acid treated resin was washed with water and treated with excess of one normal ammonium hydroxide in a beaker to convert from the acid form to the ammonium form by simple neutralization. A glass column, ½ inch diameter × 12 inches high, was packed with 25 ml. of the ammonium hydroxide treated resin. The resin was treated further with dilute ammonium hydroxide in the column and water-washed to pH 10. A solution 0.27 M in $UO_2F_2$ was fed in downflow through the resin column at about 1 ml. per minute. The effluent solution was sampled at 10 ml. volume intervals for the purpose of determining the uranium and fluoride concentrations. At the end of the experiment, when the pH had fallen to 3.6, a total volume of 425 ml. of the effluent solution had been put through the column. The wet volume of the loaded resin at this stage was 14.5 ml. The resin was water-washed and air dried at room temperature. The dried volume of the loaded resin was 7.5 ml. As can be observed from this figure, the resin continued to load substantially all of the uranium until it was loaded to about 40 percent of capacity.

After 6.5 hours, the resin was loaded to about 95 percent of its capacity, i.e., 3.4 mg U per milliliter in the acid form.

EXAMPLE II

Amberlite IRC-72 resin in the hydrogen form and of 26–32 mesh size was treated with ammonium hydroxide and washed to pH 10 as described in Example I. The volume of resin packed into a 28 mm inside diameter column measured 210 ml. Uranyl fluoride solution 0.3 M in concentration and having a pH of 3.0 was passed through the column in downflow at about 1 ml/minute. The resin was loaded using 1600 ml. of the $UO_2F_2$ solution at which point the effluent solution showed 60.3 mg U and 10.9 mg F per ml. The resin volume had decreased to 127 ml. The column was water-washed at 2 ml/minute with 1000 ml. of water at which point the volume of resin was further reduced to 120 ml. The resin was dried in a stream of air drawn through the column, using a heat lamp on the column. This further reduced the volume to 55 ml. The total weight of loaded resin was 67 grams.

EXAMPLE III

The dried product from Example II was removed from the column, mixed and chemically analyzed. The results were:

| | | |
|---|---|---|
| U (wt. %) | : | 42.17 |
| F (wt. %) | : | 0.22 |

-continued

| | | |
|---|---|---|
| Free H$_2$O (wt. %) | : | 5.03 |

The dried and blended product from Example II was carbonized by heating to 1200° C in argon at a rate of about 2° C/min. After carbonization, the fluoride content of the microspheres was 0.36 wt. %. Subsequent heating to 1700° C in argon for 15 minutes reduced the fluoride content to 0.058 wt. %.

It is thus seen that the process of this invention provides a technique whereby resin derived nuclear fuel may be produced from the isotope-enriched UF$_6$ of a diffusion plant with considerably fewer steps than was required in the prior art. Additionally, this process provides a means for loading weak acid ion exchange resins with uranyl ions from an aqueous solution of uranyl fluoride which heretofore was not possible. As many variations will be apparent to those in the art, the process as described and disclosed above is to be limited only to the extent set forth in the appended claims.

What is claimed is:

1. A process for loading a cation exchange resin with uranyl ions comprising:
    contacting said resin in the ammonium form with an aqueous uranyl fluoride solution whereby uranyl ions in said solution exchange with ammonium ions in said resin to produce a resin loaded with uranyl ions.

2. The process according to claim 1 wherein said resin has a carboxylic acid functional group.

3. The process according to claim 1 wherein said solution is 0.1 to 1 molar in uranyl fluoride prior to said step of contacting.

4. The process according to claim 1 wherein said resin is an acrylic divinyl benzene copolymer having a carboxylic acid functional group.

5. The process according to claim 4 wherein said resin has a moisture content of 71 to 73 weight percent.

6. The process according to claim 1 wherein, prior to said step of contacting, said resin is in the hydrogen form and is converted to the ammonium form by reacting with ammonium hydroxide.

* * * * *